US012770049B2

(12) United States Patent
Quader et al.

(10) Patent No.: US 12,770,049 B2
(45) Date of Patent: Oct. 20, 2026

(54) LABELING DATA USING AUTOMATED WEAK SUPERVISION

(71) Applicant: INTERNATIONAL BUSINESS MACHINES CORPORATION, Armonk, NY (US)

(72) Inventors: Shaikh Shahriar Quader, Scarborough (CA); Jean-François Puget, Saint Raphael (FR); Mona Nashaat Ali Elmowafy, Edmonton (CA)

(73) Assignee: International Business Machines Corporation, NY (US)

( * ) Notice: Subject to any disclaimer, the term of this patent is extended or adjusted under 35 U.S.C. 154(b) by 949 days.

(21) Appl. No.: 16/732,792

(22) Filed: Jan. 2, 2020

(65) Prior Publication Data

US 2021/0209412 A1 Jul. 8, 2021

(51) Int. Cl.

| | |
|---|---|
| ***G06N 20/00*** | (2019.01) |
| ***G06F 18/214*** | (2023.01) |
| ***G06N 5/01*** | (2023.01) |
| ***G06N 7/01*** | (2023.01) |
| ***G06N 20/10*** | (2019.01) |

(52) U.S. Cl.

CPC ........... *G06N 20/00* (2019.01); *G06F 18/214* (2023.01); *G06N 5/01* (2023.01); *G06N 7/01* (2023.01); *G06N 20/10* (2019.01)

(58) Field of Classification Search

CPC ...... G06K 9/6256; G06N 5/003; G06N 7/005; G06N 20/00; G06N 20/10; G06N 7/01; G06N 5/01; G06F 18/214

See application file for complete search history.

(56) References Cited

U.S. PATENT DOCUMENTS

| | | | | |
|---|---|---|---|---|
| 9,607,246 | B2 | 3/2017 | Jebara et al. | |
| 2008/0140589 | A1* | 6/2008 | Basu | G06F 18/214 370/252 |
| 2013/0097103 | A1 | 4/2013 | Chari et al. | |
| 2019/0034807 | A1 | 1/2019 | Clark et al. | |

(Continued)

FOREIGN PATENT DOCUMENTS

| | | |
|---|---|---|
| WO | 2019045759 | 3/2019 |

OTHER PUBLICATIONS

Varma et al., Snuba: Automating Weak Supervision to Label Training Data, Proceedings VLDB Endowment, Nov. 2018; 12(3) , 43 pages (Year: 2018).*

(Continued)

*Primary Examiner* — Markus A. Vasquez

(74) *Attorney, Agent, or Firm* — Seed Intellectual Property Law Group LLP

(57) ABSTRACT

A computer-implemented method includes: receiving, by a computing device, data comprising a labeled dataset and an unlabeled dataset; generating, by the computing device, a set of heuristics using the labeled dataset; generating, by the computing device, a vector of initial labels by labeling each point in the unlabeled dataset using the set of heuristics; generating, by the computing device, a refined set of heuristics using data-driven active learning; generating, by the computing device, a vector of training labels by automatically labeling each point in the unlabeled dataset using the refined set of heuristics; and outputting, by the computing device, the vector of training labels to a client device or a data repository.

19 Claims, 5 Drawing Sheets

(56) References Cited

U.S. PATENT DOCUMENTS

2019/0147297 A1 5/2019 Rogers et al.
2021/0174153 A1* 6/2021 Rane .................... G06F 18/217

OTHER PUBLICATIONS

Nashaat et al., Hybridization of Active Learning and Data Programming for Labeling Large Industrial Datasets, 2018 IEEE International Conference on Big Data (Big Data), Dec. 10-13, 2018, pp. 46-55 (Year: 2018).*

Konyushkova et al., Learning Active Learning from Data, arXiv:1703.03365v3, Jul. 14, 2017, 10 pages (Year: 2017).*

Ratner et al., Snorkel: Rapid Training Data Creation with Weak Supervision, arXiv:1711.10160v1, Nov. 28, 2017, 17 pages (Year: 2017).*

Silipo et al., Labeling with Active Learning, retrieved from https://www.knime.com/blog/labeling-with-active-learning, Oct. 17, 2019, 21 pages (Year: 2019).*

Wikipedia. Decision Stump. Article version from Dec. 23, 2019. https://en.wikipedia.org/w/index.php?title=Decision_stump&oldid=932098366 (Year: 2019).*

Anonymous, "Generative model", Generative model—Wikipedia, https://en.wikipedia.org/wiki/Generative_model, accessed Dec. 20, 2019, 6 pages.

Anonymous, "Data science and machine learning", Machine Learning | IBM, https://www.ibm.com/analytics/machine-learning, accessed Dec. 19, 2019, 9 pages.

Varma, "Snuba: Automating Weak Supervision to Label Training Data", ACM Digital Library, https://dl.acm.org/doi/10.14778/3291264.3291268, Nov. 2018, 14 pages.

Shioulin, "Automating Weak Supervision", Cloudera Fast Forward Labs , https://blog.fastforwardlabs.com/2019/09/27/automating-weak-supervision.html, Sep. 27, 2019, 5 pages.

Anonymous, "Automated Data Labeling With Machine Learning", Azati Software, https://azati.ai/automated-data-labeling-with-machine-learning/, Jun. 4, 2019, 10 pages.

Anonymous, "Decision stump", Decision stump—Wikipedia, https://en.wikipedia.org/wiki/Decision_stump, accessed Dec. 19, 2019, 2 pages.

Anonymous, "Weak supervision", Weak supervision—Wikipedia, https://en.wikipedia.org/wiki/Weak_supervision, accessed Dec. 19, 2019, 3 pages.

Fu et al., "A survey on instance selection for active learning", Knowl. Inf. Syst., vol. 35, No. 2, Jun. 6, 2012, 35 pages.

Salimans et al., "Improved Techniques for Training GANs", arXiv:1606.03498v1, Jun. 10, 2016, 10 pages.

Ratner et al., "Data Programming: Creating Large Training Sets, Quickly", Advances in Neural Information Processing Systems, Eds. Curran Associates, Inc., May 26, 2016, 27 pages.

Nashaat et al., "Asterisk: Generating Large Training Datasets with Automatic Active Supervision", ACM/IMS Transactions on Data Science, vol. 1, No. 2, Article 13, May 2020, 28 pages.

* cited by examiner

LABELING DATA USING AUTOMATED WEAK SUPERVISION

BACKGROUND

Aspects of the present invention relate generally to machine learning and, more particularly, to using automated weak supervision to label training data that is used to train a machine learning model.

Machine learning is a form of artificial intelligence (AI) that enables a system to learn from data rather than through explicit programming. In machine learning, a machine learning model is built using algorithms that iteratively learn from training data. Training data can be described as data points that include patterns, which the resulting machine learning model should accurately predict.

An example training technique includes supervised learning, in which the training data is labeled, and the labeled training data is processed (e.g., using linear regression) to infer the machine learning model. Weak supervision is a branch of machine learning where noisy, limited, or imprecise sources are used to provide supervision signal for labeling large amounts of training data in a supervised learning setting.

SUMMARY

In a first aspect of the invention, there is a computer-implemented method including: receiving, by a computing device, data comprising a labeled dataset and an unlabeled dataset; generating, by the computing device, a set of heuristics using the labeled dataset; generating, by the computing device, a vector of initial labels by labeling each point in the unlabeled dataset using the set of heuristics; generating, by the computing device, a refined set of heuristics using data-driven active learning; generating, by the computing device, a vector of training labels by automatically labeling each point in the unlabeled dataset using the refined set of heuristics; and outputting, by the computing device, the vector of training labels to a client device or a data repository.

In another aspect of the invention, there is a computer program product including one or more computer readable storage media having program instructions collectively stored on the one or more computer readable storage media. The program instructions are executable to: receive data comprising a labeled dataset and an unlabeled dataset; generate a set of heuristics using the labeled dataset; generate a vector of initial labels by labeling each point in the unlabeled dataset using the set of heuristics; generate a refined set of heuristics using data-driven active learning; generate a vector of training labels by automatically labeling each point in the unlabeled dataset using the refined set of heuristics; and output the vector of training labels to a client device or a data repository.

In another aspect of the invention, there is system including a processor, a computer readable memory, one or more computer readable storage media, and program instructions collectively stored on the one or more computer readable storage media. The program instructions are executable to: receive data comprising a labeled dataset and an unlabeled dataset; generate a set of heuristics using the labeled dataset; generate a vector of initial labels by labeling each point in the unlabeled dataset using the set of heuristics; generate a refined set of heuristics using data-driven active learning; generate a vector of training labels by automatically labeling each point in the unlabeled dataset using the refined set of heuristics; and output the vector of training labels to a client device or a data repository.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
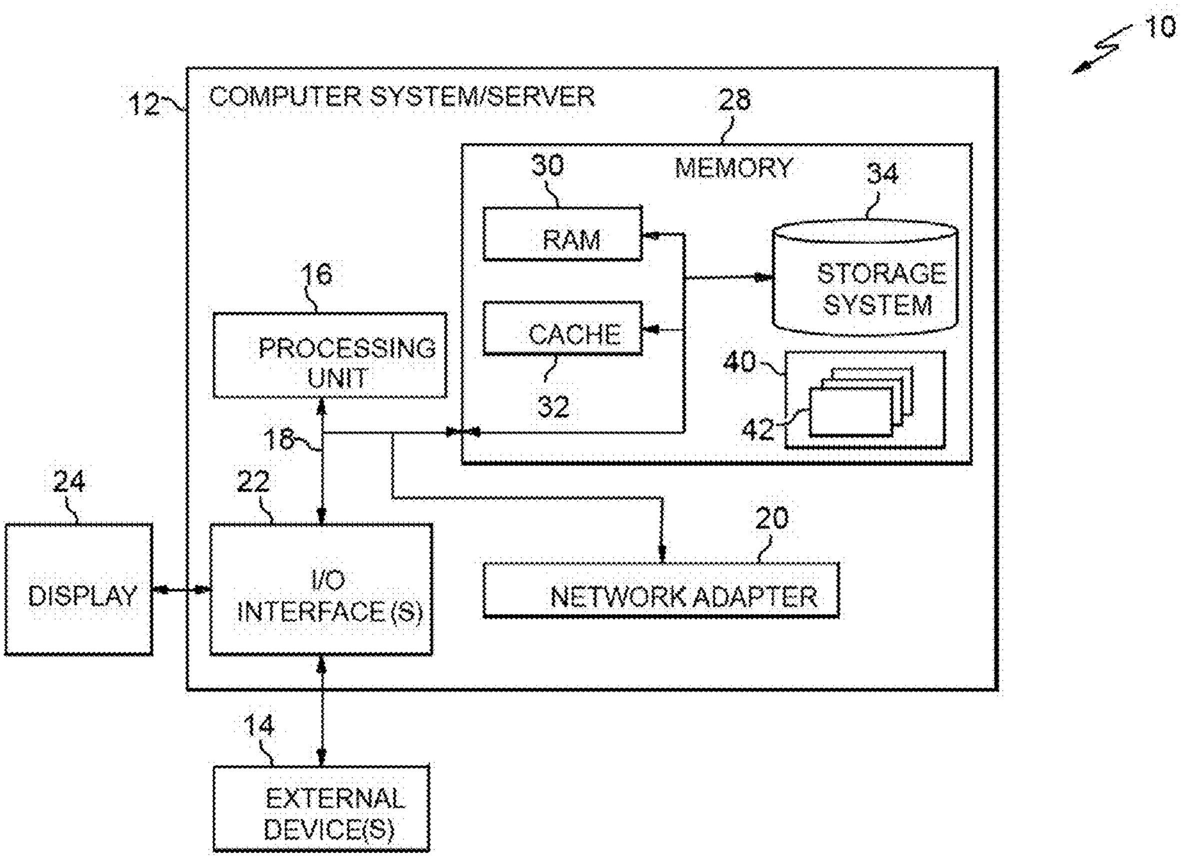
FIG. 1 depicts a computer infrastructure according to an embodiment of the present invention.

Aspects of the present invention relate generally to machine learning and, more particularly, to using automated weak supervision to label training data that is used to train a machine learning model. In embodiments, a first phase of a method includes a system receiving a labeled dataset and an unlabeled dataset, automatically generating a set of heuristics from the labeled dataset, and using the set of heuristics to produce initial labels for the data in the unlabeled dataset. According to aspects of the invention, the system generates the set of heuristics automatically without input from a human user. In embodiments, after generating the set of heuristics and the initial labels, a second phase of the method includes designing a query strategy based on the data distribution and output of the first phase, and using the query strategy to prompt a user to input true labels for a small subset of the data in a data-driven active learning procedure. In embodiments, the output of the second phase is a set of refined heuristics that the system uses in a third phase to produce probabilistic training labels for the data in the unlabeled dataset. In this manner, implementations of the invention automate aspects of weak supervision to produce labels for training data for machine learning models.

Organizations in different domains are increasingly investing in machine learning to empower their data-driven decisions. However, one of the most tedious tasks in creating machine learning models is obtaining hand-labeled training data, especially with the new revolutionary advances that deep learning methods bring to the field of machine learning. Since such techniques require large training datasets, the cost of labeling these datasets has become a significant expense for businesses and large organizations. In real-world settings, domain experience is usually required to accomplish, or at least supervise such labeling processes; this makes the process of obtaining large-scale hand-labeled training data prohibitively expensive.

Aspects of the present invention address these issues by providing a framework for generating high-quality labeled datasets at scale. In an embodiment, a method includes an iterative process to automatically generate high accuracy heuristics to assign initial labels to unlabeled data. In this embodiment, the method then applies a data-driven active learning process to further enhance the quality of the generated heuristics. In this embodiment, the method includes learning the active learning strategy while considering the modeled accuracies of the produced heuristics and the noise in the generated labels. In this embodiment, the method includes applying the learned strategy to economically engage the user and enhance the quality of the generated labels. In this manner, implementations of the invention are usable to provide labels for unlabeled data, which can then be used to train a machine learning model in a supervised learning context.

According to aspects of the invention, there is a computer-implemented process for generating training datasets, the computer-implemented process comprising: in response to receiving a set of labeled data, generating a set of heuristics and a set of generated weak labels using a first iterative process including creating, testing, and ranking heuristics in each, and every, iteration that only exceed a predetermined level of accuracy of heuristics; analyzing disagreements between the heuristics generated to model associated accuracies; applying a data-driven automated learning process to analyze the generated weak labels and modeled accuracies of the heuristics generated to identify only possible points to provide true labels; prompting a user to provide true labels only for the possible points; in response to receiving the true labels from the user, refining a set of initial labels generated by the heuristics, using a second iterative process to create refined labels; and in response to an examination of the refined labels meeting a predetermined threshold, creating a set of probabilistic labels for training a downstream classifier.

Implementations of the invention improve the performance of a computer system that is used to label data for use in training machine learning models. The inventors evaluated a framework in accordance with aspects of the invention by comparing its performance with other weak supervision techniques such as data programming and automated weak supervision, along with active learning strategies. The empirical results show that the framework in accordance with aspects of the invention can significantly enhance the learned accuracy of the generated heuristics by up 44%, while producing high coverage labels for up to 91% of the unlabeled dataset. Also, comparing to the weak supervision techniques, the results show that the framework in accordance with aspects of the invention improves the quality of the generated labels by 28% on average. As well, the framework in accordance with aspects of the invention can reduce the annotation effort by up to 53% when compared to the baseline active learning strategies. Aspects of the invention also have a practical application of generating training data by applying labels to previously unlabeled data, which training data can then be used in training a machine learning model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
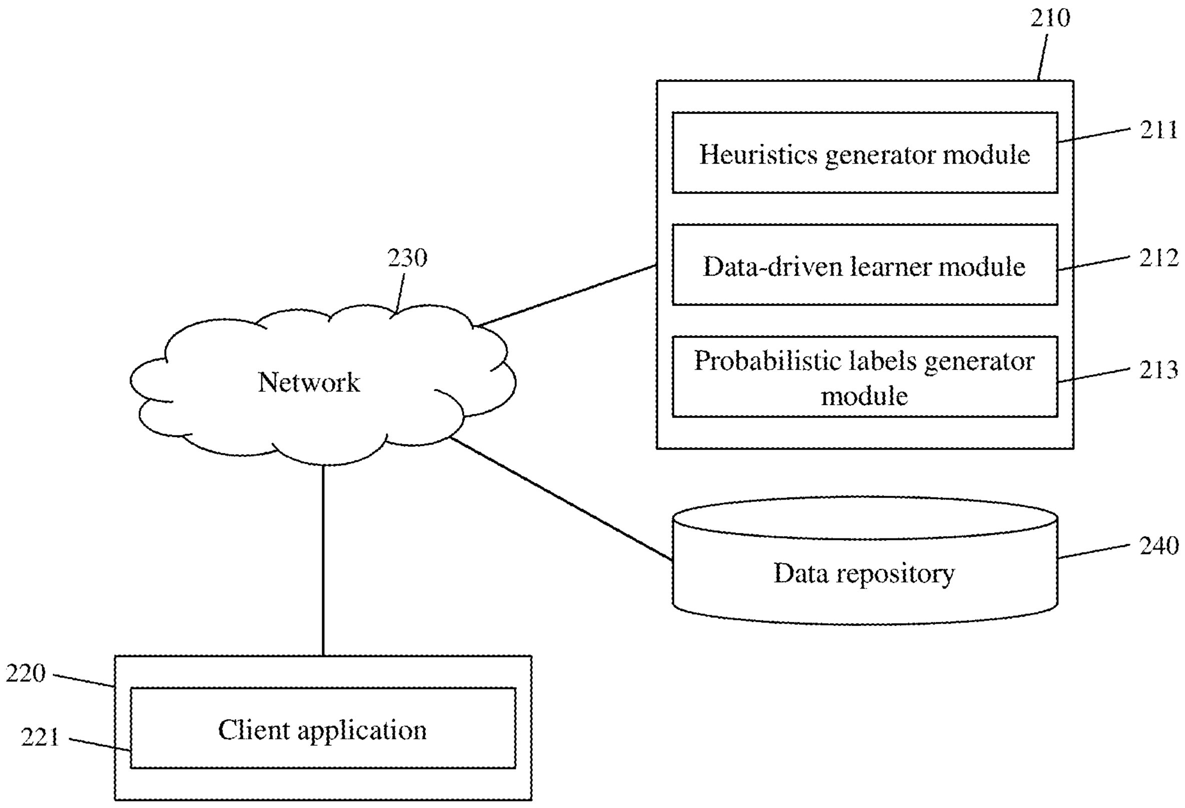
FIG. 2 shows a block diagram of an exemplary environment in accordance with aspects of the invention.

FIG. 2 shows a block diagram of an exemplary environment in accordance with aspects of the invention. The environment includes a labeling server 210 that is configured to generate training data by applying labels to unlabeled data using processes described herein. In embodiments, the labeling server 210 is a computing device, a virtual machine, or a container. When the labeling server 210 is implemented as a computing device, it may comprise one or more physical computing devices that include one or more elements of computer system 12 of FIG. 1, for example. When the labeling server 210 is implemented as a virtual machine, it may comprise one or more Java virtual machines (JVM), for example. When the labeling server 210 is implemented as a container, it may comprise one or more Docker containers, for example. The terms "Java" and "Docker" may be subject to trademark rights in various jurisdictions throughout the world and are used here only in reference to the products or services properly denominated by the marks to the extent that such trademark rights may exist.

In embodiments, the labeling server 210 comprises a heuristics generator module 211, a data-driven learner module 212, and a probabilistic labels generator module 213, each of which may comprise one or more program modules such as program modules 42 described with respect to FIG. 1. The labeling server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the heuristics generator module 211 is configured to automatically produce a set of heuristics using a labeled dataset and use the heuristics to automatically assign initial labels to data points in an unlabeled dataset. In one implementation, the heuristics generator module 211 receives the labeled dataset and the unlabeled dataset from a client device 220 via a network 230. For example, a user may use a client application 221 running on the client device 220 to upload one or more computer readable files containing the labeled dataset and the unlabeled dataset to the heuristics generator module 211. In another implementation, the heuristics generator module 211 obtains the labeled dataset and the unlabeled dataset from a data repository 240. For example, a user may use the client application 221 running on the client device 220 to designate one or more computer readable files that are stored in the data repository 240 and that contain the labeled dataset and the unlabeled dataset, and based on this designation the heuristics generator module 211 may obtain the designated one or more computer readable files from the data repository 240. The data repository 240 may be included in the labeling server 210 or may be connected to the labeling server 210 via the network 230.

In accordance with aspects of the invention, the data-driven learner module 212 is configured to work with the outcomes of the heuristics generator module 211 to further examine the data and refine the initial labels. In embodiments, the data-driven learner module 212 is configured to enhance the accuracy of the generated heuristics and increase the coverage of the generated training data. In this manner, the data-driven learner module 212 economically engages a user to express their domain experience and uses their input in the refinement process.

In accordance with aspects of the invention, the probabilistic labels generator module 213 is configured to learn the accuracy of these labels and assign a single label for each data point in the unlabeled dataset. In this manner, the probabilistic labels generator module 213 generates training data (e.g., by applying a label to each data point in the unlabeled dataset) that can be used to train a machine learning model. In embodiments, the probabilistic labels generator module 213 stores the training data as structured data in one or more computer-readable files in the data repository 240.

Figure 3:
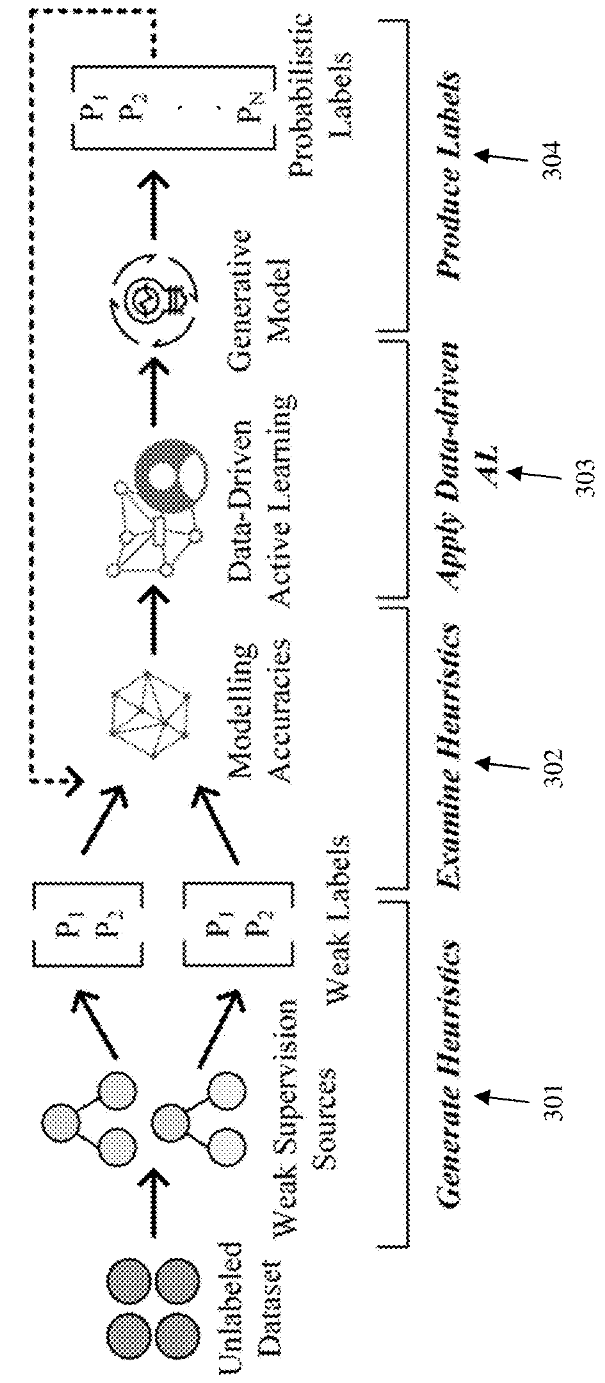
FIG. 3 shows a functional block diagram in accordance with aspects of the invention.

FIG. 3 shows a functional block diagram in accordance with aspects of the invention. Steps illustrated in the functional block diagram may be carried out in the environment of FIG. 2 and are described with reference to elements depicted in FIG. 2.

In embodiments, at step 301 the system (e.g., the labeling server 210) exploits a small set of labeled data and automatically produces a set of heuristics to assign initial labels to a larger unlabeled dataset. In this phase, the heuristics generator module 211 applies an iterative process of creating, testing, and ranking heuristics in each, and every, iteration to only accommodate high-quality heuristics. At step 302, the data-driven learner module 212 examines disagreements between these heuristics (from step 301) to model their accuracies. In order to enhance the quality of the generated labels, at step 303, the data-driven learner module 212 improves the accuracies of the heuristics by applying a data-driven active learning (AL) process. According to aspects of the invention, during this data-driven AL process, the system examines the generated weak labels along with the modeled accuracies of the heuristics to help the learner decide on the points for which the user should provide true labels. In this manner, implementations of the invention aim to enhance the accuracy and the coverage of the training data while engaging the user in the loop (e.g., via the client device 220) to execute the enhancement process. In accordance with aspects of the invention, by incorporating the underlying data representation, the user is only queried at step 303 about a subset of the points that are expected to enhance the overall labeling quality. In this manner, the manual labeling of data points by a domain expert is minimized. The true labels provided by the users are used to refine the initial labels generated by the heuristics. As the figure shows, the refinement process can be repeated to further enhance the quality of the generated labels. At step 304, the probabilistic labels generator module 213 examines the refined labels and outputs a set of probabilistic labels that can be used to train any downstream classifier (e.g., machine learning model).

Figure 4:
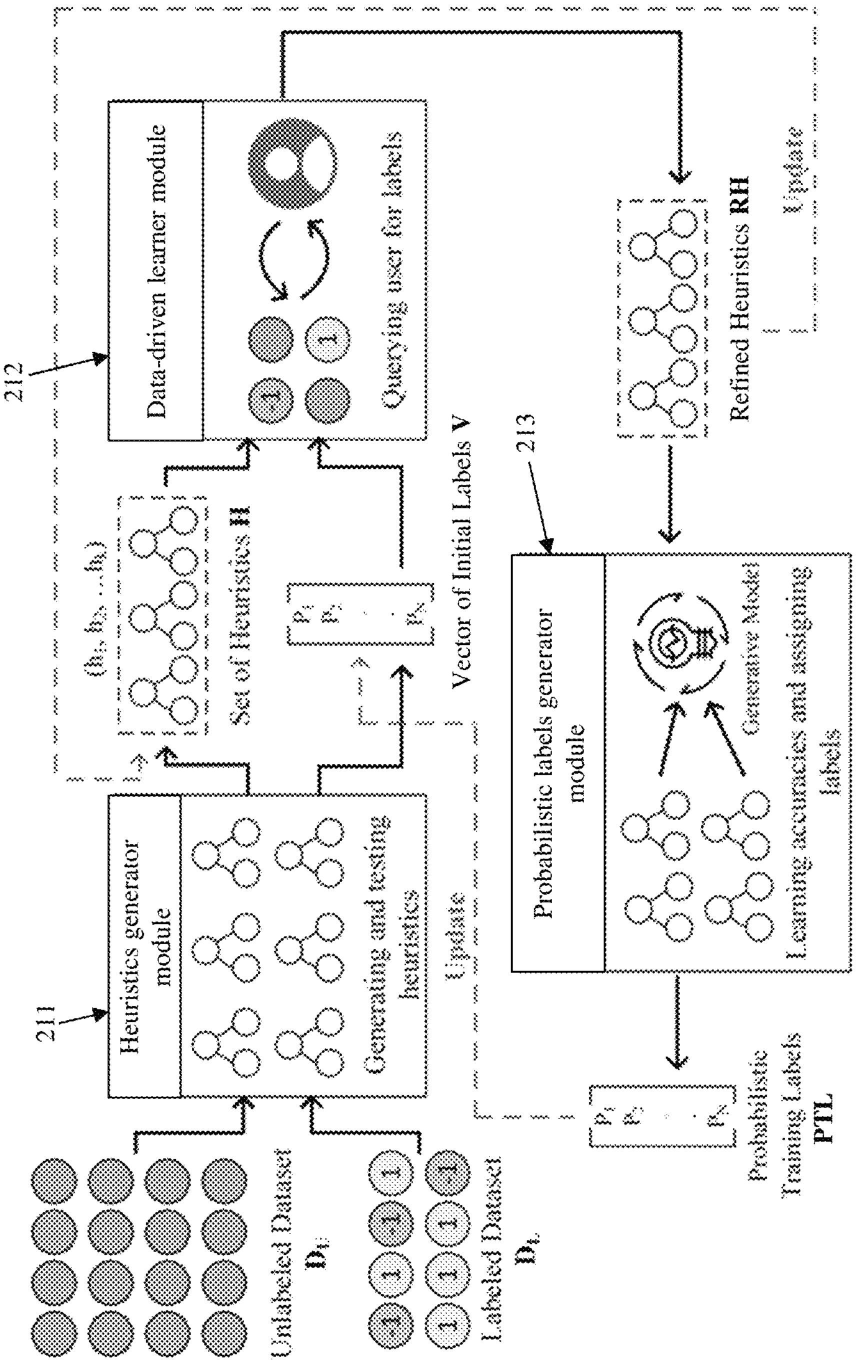
FIG. 4 shows a functional block diagram in accordance with aspects of the invention.

FIG. 4 shows a functional block diagram in accordance with aspects of the invention. A method illustrated by the functional block diagram may be carried out in the environment of FIG. 2 and may use techniques of steps 301-304 described with respect to FIG. 3. For example, a first phase of a method described in FIG. 4 corresponds to step 301 of FIG. 3, a second phase of the method corresponds to steps 302 and 303, and a third phase of the method corresponds to step 304.

Referring now to FIG. 4, in the first phase according to aspects of the invention, the heuristics generator module 211 receives a labeled dataset (DL) and an unlabeled dataset (DU) as inputs and outputs a set of heuristics (H) and a vector (V) of initial probabilistic labels. In embodiments, the heuristics generator module 211 generates the heuristics by employing a process of creating a set of probabilistic classification models that take one or more features as input and calculate probability distribution over a set of classes. Then, the heuristics generator module 211 uses this distribution to either assign labels to the unlabeled dataset (i.e., assigns either −1 or 1) or abstain (i.e., outputs (0)).

In one example, the heuristics generator module 211 creates a set of weak classifiers by diving DL into a training dataset and an evaluation dataset, and employing one or more classifier algorithms and an iterative process of all possible combinations of input features to determine classifiers that perform well when applied to the evaluation dataset. Classifier algorithms may include, but are not limited to, decision stump algorithms and random forest algorithms. More specifically, in one exemplary implementation, the heuristics generator module 211 uses an ensemble of decision stumps as the inner classification model to mimic the threshold-based heuristics that users usually write.

In embodiments, to create the final set of heuristics H, the heuristics generator module 211 follows the iterative process of defining the input (features) for the potential models, creating the models (heuristics), and evaluating their performance and coverage. After these steps, the heuristics generator module 211 ranks the heuristics generated by each, and every, iteration to decide upon which heuristic to add to the set H. In accordance with aspects of the invention, the heuristics generator module 211 automatically generates the set of heuristics H using the techniques described herein, and does not prompt a user for input about the heuristics (e.g., does not employ user input in automatically generating the set of heuristics H).

In embodiments, to combine the output of the heuristics and generate the vector V of initial labels, the heuristics generator module 211 employs a generative model to learn the accuracies of the heuristics in H and produce a single probabilistic label for each data point in the unlabeled dataset. In one example, the heuristics generator module 211 generates a matrix in which each row of the matrix corresponds to one data point of DU and each column of the matrix corresponds to one heuristic of the set of heuristics H. In this example, the heuristics generator module 211 uses a generative model to create the vector V from the matrix, wherein the vector V includes a single probabilistic label for each data point in the unlabeled dataset DU.

Still referring to FIG. 4, and according to aspects of the invention, in a second phase of the method the data-driven learner module 212 examines the output (e.g., H and V) of the heuristics generator module 211 to enhance the quality of the generated labels. The system accomplishes this enhancement by involving a user in this phase and using active learning based on input received from the user. However, in contrast to using traditional active learning scenarios that are not data-driven, implementations of the invention apply a data-driven approach to learn a query strategy. In embodiments, the approach formulates the process of designing the query strategy as a regression problem. In one example, the data-driven learner module 212 trains a regression model to predict the reduction of the generalization error associated with adding a labeled point $\{x_i, y_i\}$ to the training data of a classifier. In this example, the regressor serves as the query strategy in the problem settings, and it outperforms baseline strategies since it is customized to the underlying distribution and considers the output of the generative model.

In embodiments, the data-driven learner module 212 performs two processes. First, the data-driven learner module 212 designs an active learning (AL) query strategy that fits the data distribution for a given problem, e.g., based on H and V. Second, the data-driven learner module 212 applies the query strategy as a data-driven AL process. By utilizing these processes in accordance with aspects of the invention, a portion of the low confidence labels in the initial vector V of probabilistic labels is replaced by true labels, and a refined heuristics matrix RH is generated, which is an improved version of H.

In embodiments, the low confidence points are originated when either the heuristics abstain from labeling or disagree on specific points. Therefore, the data-driven learner module 212 enhances the quality of the labels by trying to eliminate the abstaining effect and resolve the disagreements between the heuristics to increase their accuracies.

In embodiments, the data-driven learner module 212 performs the second phase by determining a confidence level of each label in V (e.g., either high confidence or low confidence), and selecting one or more of the low confidence labels to present to a user so that the user can provide input defining true labels for the data points having the low confidence labels. In embodiments, a high confidence label is one in which the number of heuristics (in the matrix) that agree on the label exceeds a predefined threshold number, and a low confidence label is one in which the number of heuristics (in the matrix) that agree on the label is less than the predefined threshold number. In one example, the data-driven learner module 212 trains a regression model using the data in V (e.g., as described above), and then uses the regression model as a query strategy to determine which low confidence labels in V to present to the user for manual labeling. In this manner, the active learning is data-driven because it is based on the regression model that is trained using the data (e.g., the data in V), as opposed to a query strategy in which data points are randomly chosen for manual labeling.

With continued reference to FIG. 4, in a third phase of the method the probabilistic labels generator module 213 learns the accuracies of the generated heuristics using the refined heuristics matrix RH, and then combines all the output of these heuristics to produce a vector of probabilistic labels (PTL) that includes a single probabilistic label for each point in DU. In embodiments, this process is accomplished by learning the structure of a generative model that utilizes the refined matrix RH to model a process of labeling the training set.

As depicted in FIG. 4, the processes of updating the heuristics and generating the final probabilistic labels may be iterative. Therefore, after outputting PTL, the system informs the user of results including, for example, the performance of the final heuristics, the coverage obtained in DU, the status of the generated probabilistic labels such as the number of low confidences labels, and the number of true labeled consumed so far. For example, the server 210 may transmit data defining these results to the client device 220 for display thereon, e.g., via the client application 221. In embodiments, the system prompts the user to either terminate the process (e.g., accept the results) or initiate another cycle to further refine the output labels. In the event the user provides input to initiate another cycle, then RH and PTL are provided as inputs to the data-driven active learner module 212 as indicated at the dashed lines labeled "Update" in FIG. 4, at which point the data-driven active learner module 212 goes through another iteration of determining a query strategy and then prompting the user for input of true labels based on the determined query strategy (e.g., RH and PTL, which change with each iteration, are used as inputs to data-driven active learner module 212 in subsequent iterations, with H and V being the inputs only for the first pass). In the event the user provides input to accept the results, then the output of the generative model (e.g., the labeled training data in PTL) is transmitted to the client device 210 and/or stored in the data repository 240. The output of the generative model can then be used to train any noise-aware discriminative model to generalize beyond the generated observations.

Figure 5:
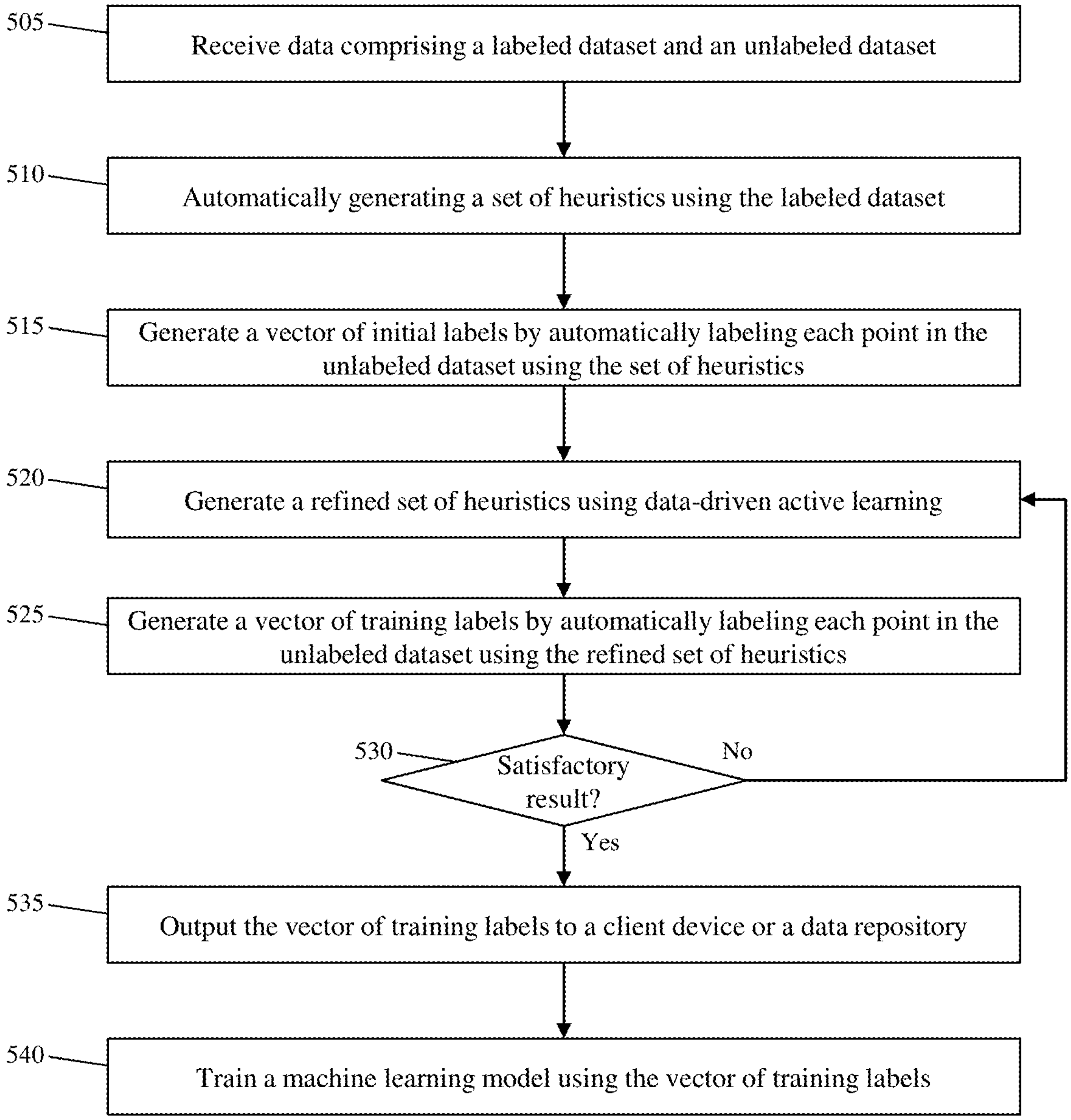
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 2 and using the techniques described in FIGS. 3 and 4.

At step 505, the system receives data comprising a labeled dataset and an unlabeled dataset. In embodiments, and as described with respect to FIGS. 2-4, the heuristics generator module 211 receives data comprising DL and DU from client device 220. Alternatively, the heuristics generator module 211 obtains data comprising DL and DU from the data repository 240.

At step 510, the system automatically generates a set of heuristics using the labeled dataset. In embodiments, and as described with respect to FIGS. 2-4, the heuristics generator module 211 generates a set of heuristics H using the labeled dataset DL. In accordance with aspects of the invention, the heuristics generator module 211 generates the set of heuristics H without using input from a user.

At step 515, the system generates a vector of initial labels by automatically labeling each point in the unlabeled dataset using the set of heuristics. In embodiments, and as described with respect to FIGS. 2-4, the heuristics generator module 211 uses the set of heuristics H to create a vector V of initial labels for all data points in the unlabeled dataset DU. Like step 510, this step is also fully automated and does not rely on input from a user.

At step 520, the system generates a refined set of heuristics using data-driven active learning. In embodiments, and as described with respect to FIGS. 2-4, the data-driven active learner module 212 generates a query strategy based on the data in V (e.g., using a regression model), and then uses the query strategy to select which ones of the labels contained in V to present to a user for manual labeling. The data-driven active learner module 212 then revises the heuristics based on the manual labeling provided by the user. The data-driven active learner module 212 may perform step 520 in an iterative manner, and the output of step 520 after a final iteration is a set of revised heuristics RH.

At step 525, the system generates a vector of training labels by automatically labeling each point in the unlabeled dataset using the refined set of heuristics. In embodiments, and as described with respect to FIGS. 2-4, the probabilistic labels generator module 213 uses the refined heuristics RH with a generative model to produce a vector of probabilistic labels (PTL) that includes a single probabilistic label for each data point in DU.

At step 530, the system determines whether the process has produced a satisfactory result. In embodiments, and as described with respect to FIGS. 2-4, the server 210 prompts to user to indicate whether the accept the result (e.g., satisfactory) or run another iteration (unsatisfactory). In the event the result is not satisfactory (e.g., the user provides input to run another iteration), then the process returns to step 520 using RH and PTL as inputs to the data-driven active learner module 212 (instead of H and V which are used as inputs only during the first pass). In the event the result is satisfactory (e.g., the user provides input to accept the results), then at step 535 the system outputs the vector of training labels PTL to a client device 220 or a data repository 240. Optionally, at step 540 this system or another system trains a machine learning model using the vector of training labels PTL, e.g., using supervised learning with the labeled data.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a computing device, data comprising a labeled dataset and an unlabeled dataset;

generating, by the computing device, a set of heuristics using the labeled dataset without user input to automatically assign initial labels to a plurality of data points in the unlabeled dataset;

generating, by the computing device, a vector of initial labels for each data point in the unlabeled dataset by automatically labeling each data point in the unlabeled dataset using the set of heuristics;

generating, by the computing device, a refined set of heuristics using data-driven active learning, wherein the data-driven active learning comprises an active learning query strategy and a query strategy, and wherein:

the active learning query strategy is generated by instructions comprising a data-driven active learner module based on the set of heuristics and the vector of initial labels, and the query strategy is generated by the instructions comprising the data-driven active learner module as a data-driven active learning process to replace a portion of low confidence labels in the vector of initial labels by true labels;

learning, by a generative model, accuracies associated with each heuristic of the generated set of heuristics using the refined set of heuristics;

generating, by the computing device, a vector of probabilistic labels based on the learned accuracies by combining outputs associated with each of the generated set of refined heuristics with the generative model, wherein the vector of probabilistic labels includes a single probabilistic label corresponding to each data point in the unlabeled dataset;

sending, by the computing device, information associated with performance of the refined set of heuristics and a status of the vector of probabilistic labels to a user of a client device;

receiving, by the computing device from the user of the client device, an indication that the information associated with the performance of the refined set of heuristics and the status of the vector of probabilistic labels does not match with user requirements and that another iteration should be performed;

in response to receiving the indication, updating, by the computing device, the refined set of heuristics using the data-driven active learning to generate final probabilistic labels and results associated with the final probabilistic labels, the results including performance of the final probabilistic labels, coverage obtained in the unlabeled dataset, number of low confidence labels, and number of true labels used by the user; and outputting, by the computing device, the final probabilistic labels and the results to the client device or a data repository, wherein the final probabilistic labels are configured to train a noise-aware discriminative model.

2. The computer-implemented method of claim 1, wherein the generating the refined set of heuristics is performed in part based on the user input from the user.

3. The computer-implemented method of claim 2, wherein the user input consists of labeling the plurality of data points in the vector of initial labels, the plurality of data points corresponding to the low confidence labels in the vector of initial labels.

4. The computer-implemented method of claim 1, wherein the generating the set of heuristics comprises:

dividing the labeled dataset into a training dataset and an evaluation dataset; and creating and evaluating potential heuristics using the training dataset, the evaluation dataset, and one or more classifier algorithms selected from a group consisting of decision stump algorithms and random forest algorithms.

5. The computer-implemented method of claim 1, wherein the generating the refined set of heuristics comprises:

presenting, using the query strategy, the low confidence labels in the vector of initial labels to the user for manual labeling; and adjusting the set of heuristics based on the manual labeling.

6. The computer-implemented method of claim 1, wherein the generative model is configured to learn accuracies associated with the refined set of heuristics.

7. The computer-implemented method of claim 1, wherein the generating the refined set of heuristics is performed in part based on the user input from the user.

8. The computer-implemented method of claim 1, wherein the sending the vector of probabilistic labels to the user further comprises sending the results including the performance of the final probabilistic labels, the coverage obtained in the unlabeled dataset, the number of low confidence labels, and the number of true labels used by the user.

9. The computer-implemented method of claim 1, wherein the generating the final probabilistic labels only uses the refined set of heuristics and the vector of probabilistic labels as inputs.

10. A computer program product comprising one or more computer readable storage media having program instructions collectively stored on the one or more computer readable storage media, the program instructions executable to:

receive data comprising a labeled dataset and an unlabeled dataset;

generate a set of heuristics using the labeled dataset without user input to automatically assign initial labels to a plurality of data points in the unlabeled dataset;

generate a vector of initial labels for each data point in the unlabeled dataset by automatically labeling each data point in the unlabeled dataset using the set of heuristics;

generate a refined set of heuristics using data-driven active learning, wherein the data-driven active learning comprises an active learning query strategy and a query strategy, and wherein:

the active learning query strategy is generated by instructions comprising a data-driven active learner module based on the set of heuristics and the vector of initial labels, and the query strategy is generated by the instructions comprising the data-driven active learner module as a data-driven active learning process to replace a portion of low confidence labels in the vector of initial labels by true labels;

learn, through a generative model, accuracies associated with each heuristic of the generated set of heuristics using the refined set of heuristics;

generate a vector of probabilistic labels based on the learned accuracies by combining outputs associated with each of the generated set of refined heuristics with the generative model, wherein the vector of probabilistic labels includes a single probabilistic label corresponding to each data point in the unlabeled dataset;

send information associated with performance of the refined set of heuristics and a status of the vector of probabilistic labels to a user of a client device;

receive, from the user of the client device, an indication that the information associated with the performance of the refined set of heuristics and the status of the vector of probabilistic labels does not match with user requirements and that another iteration should be performed;

in response to receiving the indication, update the refined set of heuristics using the data-driven active learning to generate final probabilistic labels and results associated with the final probabilistic labels, the results including performance of the final probabilistic labels, coverage obtained in the unlabeled dataset, number of low confidence labels, and number of true labels used by the user; and output the final probabilistic labels and the results to the client device or a data repository, wherein the final probabilistic labels are configured to train a noise-aware discriminative model.

11. The computer program product of claim 10, wherein the generating the refined set of heuristics is performed in part based on the user input consisting of the user labeling the plurality of data points in the vector of initial labels.

12. The computer program product of claim 10, wherein the set of heuristics are generated using a decision stump algorithm.

13. The computer program product of claim 10, wherein the generating the refined set of heuristics comprises:

presenting, using the query strategy, the low confidence labels in the vector of initial labels to the user for manual labeling; and adjusting the set of heuristics based on the manual labeling.

14. The computer program product of claim 10, wherein the generative model is configured to learn accuracies associated with the refined set of heuristics.

15. A computing system comprising:

one or more processors, one or more computer readable storage memory, one or more computer readable storage media, and program instructions collectively stored on the one or more computer readable storage media, the program instructions executable by the one or more processors to:

receive data comprising a labeled dataset and an unlabeled dataset;

generate a set of heuristics using the labeled dataset without user input to automatically assign initial labels to a plurality of data points in the unlabeled dataset;

generate a vector of initial labels for each data point in the unlabeled dataset by automatically labeling each data point in the unlabeled dataset using the set of heuristics;

generate a refined set of heuristics using data-driven active learning, wherein the data-driven active learning comprises an active learning query strategy and a query strategy, and wherein:

the active learning query strategy is generated by instructions comprising a data-driven active learner module based on the set of heuristics and the vector of initial labels, and the query strategy is generated by the instructions comprising the data-driven active learner module as a data-driven active learning process to replace a portion of low confidence labels in the vector of initial labels by true labels;

learn, through a generative model, accuracies associated with each heuristic of the generated set of heuristics using the refined set of heuristics;

generate a vector of probabilistic labels based on the learned accuracies by combining outputs associated with each of the generated set of refined heuristics with the generative model, wherein the vector of probabilistic labels includes a single probabilistic label corresponding to each data point in the unlabeled dataset;

send information associated with performance of the refined set of heuristics and a status of the vector of probabilistic labels to a user of a client device;

receive, from the user of the client device, an indication that the information associated with the refined set of heuristics and the status of the vector of probabilistic labels does not match with user requirements and that another iteration should be performed;

in response to receiving the indication from the user that the status of the vector of probabilistic labels does not match with the user requirements, update the refined set of heuristics using the data-driven active learning to generate final probabilistic labels and results associated with the final probabilistic labels, the results including performance of the final probabilistic labels, coverage obtained in the unlabeled dataset, number of low confidence labels, and number of true labels used by the user;

output the final probabilistic labels and the results to the client device or a data repository; and train a noise-aware discriminative model with the final probabilistic labels.

16. The computing system of claim 15, wherein the generating the refined set of heuristics is performed in part based on the user input consisting of the user labeling the plurality of data points in the vector of initial labels.

17. The computing system of claim 15, wherein the set of heuristics are generated using a decision stump algorithm.

18. The computing system of claim 15, wherein the generating the refined set of heuristics comprises:

presenting, using the query strategy, the low confidence labels of the vector of initial labels to the user for manual labeling; and adjusting the set of heuristics based on the manual labeling.

19. The computing system of claim 15, wherein the generative model is configured to learn accuracies associated with the refined set of heuristics.

* * * * *